Dec. 21, 1943.   A. C. STOCKTON   2,337,531
LATCH MECHANISM
Filed July 27, 1942
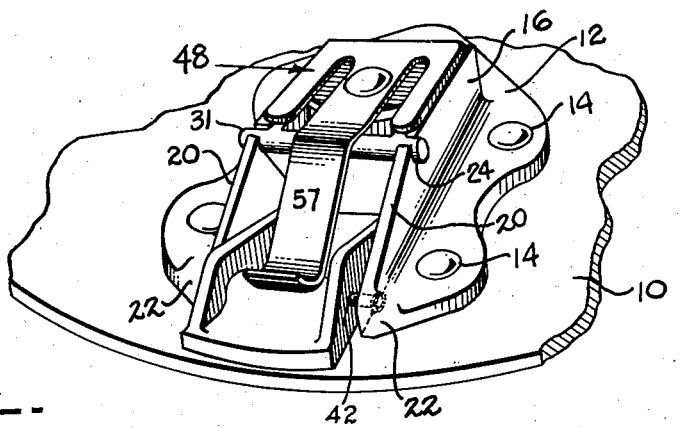
FIG. 1.
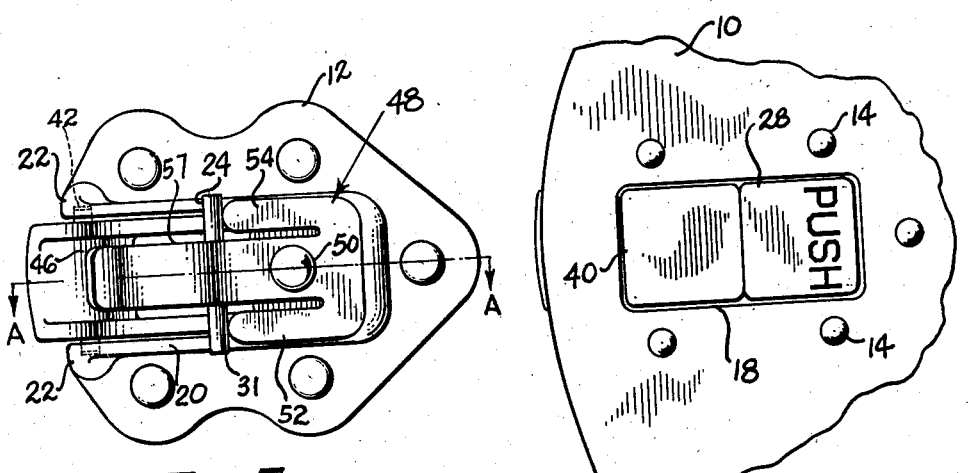
FIG. 3.
FIG. 2.
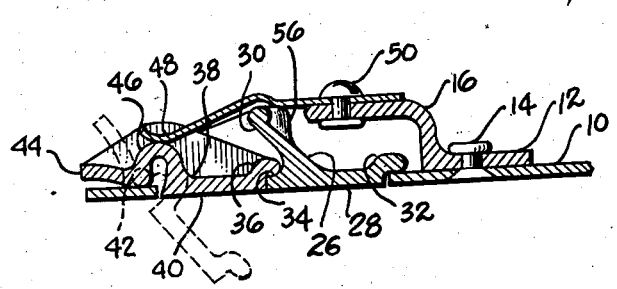
FIG. 4.
ALFRED C. STOCKTON
INVENTOR.
BY J. Edwin Coates
ATTORNEY Patented Dec. 21, 1943

2,337,531

UNITED STATES PATENT OFFICE 2,337,531

LATCH MECHANISM

Alfred C. Stockton, Los Angeles, Calif.

Application July 27, 1942, Serial No. 452,519

5 Claims. (Cl. 292—229)

This invention relates to a flush type latch which is particularly adaptable for use on doors covering inspection openings or the like.

In aircraft, for example, it is required that numerous openings be provided throughout the wing, fuselage, and empennage, through which access may be gained to the interior thereof for inspection and adjustment purposes. For instance, aircraft control cables usually run spanwise in the wing from the fuselage to the ailerons and longitudinally in the fuselage from the pilot's compartment to the elevators and rudder. These cables run over numerous pulleys and are provided with turnbuckles, all of which must be periodically inspected and adjusted. In the interest of stream-lining these openings must be closed by doors which lie flush with the exterior surfaces of the fuselage and wings, and in the interest of rapid inspection these doors must be quickly opened and closed.

Since an airplane is subject to considerable vibration and perhaps severe jar upon landing, it is necessity that the door latches be reliable to the extent of insuring that these doors will not inadvertently open. This has led to the design of rather cumbersome and intricate latches which served the purpose but were unnecessarily heavy and increased production time to no small extent. The latch comprising this invention was conceived with an eye to maintaining all of the security of previous latches but without the cumbersome or intricate features leading to the disadvantages mentioned.

The principle object of this invention, therefore, is the provision of a simple, light-weight and secure flush type door latch, and although this latch may be particularly adaptable to aircraft in the manner described, it will no doubt also find great utility in other places where an inexpensive and fool-proof latch is desired. Another object of the invention is to provide a latch having a minimum number of parts which may be readily assembled and disassembled.

Other and further objects will become apparent upon reading the specification in connection with the drawing, in which:

Figure 1 is a perspective view of a latch comprising the invention assembled on a door, only a fragment of the door being shown.

Figure 2 is a top plan view of the latch assembled on the door.

Figure 3 is a bottom plan view of the latch per se; and

Figure 4 is a cross-sectional view of the latch taken on the line A—A of Figure 3, but with the latch assembled on the door.

With reference now to the drawing, a door 10 is shown provided with a carriage 12 fastened to the inner side thereof at 14 and having a raised hollow portion 16. A rectangular opening 18 is cut in the door and the carriage 12 surrounds this opening. In the present embodiment the carriage is a single casting including a pair of webs 20 extending from the raised hollow portion 16 downwardly and each terminating in a thickened portion having a hollow chamber which serves as a bearing 22. It will be noted that these hollow portions are open sided.

Each web 20 is provided with a notch 24 at the edge thereof and intermediate the bearing 22 and the raised hollow portion 16 of the carriage.

A release member 26 having a flat surface 28 and an upwardly extending leg 30 is adapted to be pivotally carried in the notches 24, axles 31 laterally extending from the leg 30 at its uppermost extremity. At one end of the flat surface 28 there is a stepped portion 32 adapted to engage an edge of the opening 18 in the door 10. At the other end of the flat surface 28 there is a cut back or stepped portion 34 which is adapted to nest with a stepped portion 36 of a lock member 38.

The lock member 38 also has a flat surface 40 similar to the surface 28 of release member 26 and these two surfaces completely fill the opening in flush relationship with the door 10 when they are in the locked position. The lock member 38 is also provided with laterally extending axles 42 pivotally carried in the bearings 22. The latching edge 44 of the lock member extends from the pivot in an amount to bring it substantially flush with an edge of the door 10. On the opposite side of the pivot the lock member is provided with a humped or raised portion 46 over which a spring 48 is adapted to ride.

The spring is of the tri-furcated leaf type and is fixed to the raised hollow portion 16 by means of a rivet 50 or the like. The outer legs 52 and 54 of the spring are adapted to bear against a pair of ears 56 forming a part of the leg 30, extending upwardly from the release member 26. Since these ears are offset from the pivotal axis of the release member they serve to urge the stepped portion 32 thereof into locked engagement with the edge of the door 10. At the same time the pressure exerted by these legs securely holds the release member axles 31 in the notches 24.

It is the central leg 57 of the tri-furcated spring that bears against the portion 46 of the lock member 38 as previously mentioned, and since the point of bearing is to the inside of the pivot the spring pressure serves to urge the lock member in a clockwise direction about its pivot to the position shown in dotted lines in Figure 4. However, since the stepped portion 36 of the lock member is nested with the stepped portion 34 of the release member the spring only serves to hold these stepped portions securely in their nested relation as long as the release member is not displaced from its position shown in Figure 4.

It may thus be seen that with the disposition of the pivot being as it is, and with the stepped portions in engagement as described, the lock member 38 will be held securely in its Figure 4 position. When it is desired to release the lock member it is only necessary to exert pressure upon the flat surface of the release member 26 in the area marked "Push" in Figure 2 in an amount sufficient to overcome the pressure of the spring legs 52 and 54 upon the ears 56. When the pressure of the spring legs is overcome the release member will rotate in a counter-clockwise direction about its pivot and this motion will serve to disengage the stepped portions 34 and 36 whereupon the pressure exerted by the central spring leg 57 upon the lock member will force the lock member to rotate in a clockwise direction on its pivot and disengage the lock member from whatever type of keeper may be used. No keeper has been shown in the drawings since it forms no part of this invention.

When it is desired to close and latch the door 10 it is only necessary to press upon the flat surface of the lock member causing it to rotate in a counter-clockwise direction until the stepped portion engages the flat surface of the release member. Further pressure in the same direction will again force the release member to rotate in a counter-clockwise direction against the pressure of the spring legs until the stepped portion 36 has passed the stepped portion 34. As soon as this movement has taken place the spring legs will immediately force the release member to return to its original position, wherein the stepped portions 34 and 36 have again nested.

It may be seen that the entire latch comprises only 4 pieces, all of which may be simple cast parts with the exception of the leaf spring 48. As it has been shown, this spring holds the members against accidental disengagement from vibration or impact, and at the same time forces the lock member into the released position as soon as the release member 26 has been displaced manually. A third function of the spring is to hold the release member axle in the notches 24. The lock member axle is securely held in the bearings 22 by reason of the carriage casting being fixed to the door itself.

While the invention is herein shown and described in its present and preferred embodiment, it will be obvious to those skilled in the art that slight modifications may be made without departing from the scope of the invention as defined in the claims.

I claim:

1. In a flush-type latch, a carriage having a raised hollow portion, spaced webs extending from said hollow portion, a pair of open-sided bearings formed in said webs at one end thereof, a pair of notches formed in said webs intermediate each of said bearings and said hollow portion, a release member having laterally extending first axles and spaced ears adjacent said first axles, a lock member likewise having laterally extending second axles and a raised portion offset from said second axles, said second axles being carried by said pair of bearings, a tri-furcated spring fixed to said carriage and having its central leg bearing against the raised portion of said lock member in a manner to urge said lock member to a released position relative to said release member, the other two legs of said spring bearing against the spaced ears of said release member in a manner to hold the axles thereof in said web notches and urge said release member to a locked position relative to said lock member, a stepped portion on each of said members adapted to nest with each other when said members are in locked position, and means forming a part of said release member for disengaging said stepped portions whereby said spring may urge said lock member to the released position.

2. In a door having an inside and an outside and means forming an opening therethrough, a flush-type latch substantially filling said opening and comprising a carriage fixed to said door on the inside thereof and having a raised hollow portion, spaced webs extending from said hollow portion, a pair of open-sided bearings formed in said webs at one end thereof, said bearings being closed by said door when said carriage is fixed thereto, a pair of notches formed in said webs intermediate each of said bearings and said hollow portion, a release member having laterally extending first axles and spaced ears adjacent said first axles, a lock member likewise having laterally extending second axles and a raised portion offset from said second axles, said second axles being carried by said pair of bearings and held therein by the assembly of said carriage to said door, a tri-furcated spring fixed to said carriage and having its central leg bearing against the raised portion of said lock member in a manner to urge said lock member to a released position relative to said release member, the other two legs of said spring bearing against the spaced ears of said release member in a manner to hold the axles thereof in said web notches and urge said release member to a locked position relative to said lock member, a stepped portion on each of said members adapted to nest with each other when said members are in locked position, and means forming a part of said release member for disengaging said stepped portions whereby said spring may urge said lock member to the released position.

3. In a flush-type latch, a carriage having an inwardly raised hollow portion, spaced webs extending from said hollow portion, a pair of bearings formed in said webs at one end thereof, a pair of notches formed in said webs intermediate each of said bearings and said hollow portion, a release member pivoted between said webs and having pivots adjacent one end lying in said notches, a lock member pivoted in said bearings, said members having face portions flush with each other with one end of said lock member bearing against the pivoted end of said release member in locking position, and a plural forked leaf spring fixed to said hollow portion having one fork arranged to hold said release member in said notches and to urge it to locking position, and having another fork arranged to urge said lock member into unlocked position when said release member is manually pivoted out of locking position against the action of said one fork.

4. In a door having an inside and an outside and means forming an opening therethrough, a flush-type latch substantially filling said opening and comprising a carriage fixed to said door on the inside thereof, a pivoted lock member, a pivoted release member normally positioned to engage and to hold said lock member in fixed relation to said door in which relation said lock member is in locking position, each of said members having laterally extending axles about which it may pivot, means forming a pivot bearing between said carriage and said door to receive said lock member's axles, a substantial portion of said lock member projecting outside of said door when in released position, means forming inwardly directed notches in said carriage to receive said release member's axles, and spring means mounted on said carriage for pressing said last named axles into said notches for urging said release member into said normal position, and for urging said lock member out of said locking position when said release member moves out of said normal position.

5. In a door having an inside and an outside and means forming an opening therethrough, a four-piece latch substantially filling said opening and comprising a one-piece carriage fixed to said door, a one-piece lock member pivoted between said door and carriage and adapted to lie flush with the outside of said door when in the locked position, partially filling said opening and to project outside of said door when in the released position, a one-piece release member for normal positioning to hold said lock member in the flush position against outward movement, said release member being pivotally carried by said carriage and adapted to normally fill the remainder of said door opening in said normal position, lying flush with the outside thereof, and a plural forked leaf spring fixed to said carriage, one fork of said spring urging said lock member to said released position, and another fork of said spring urging said release member to its said normal flush position whenever displaced therefrom, said release member being displaceable about its pivot against the pressure of said spring in operating the latch.

ALFRED C. STOCKTON.